(12) United States Patent
Park

(10) Patent No.: US 7,837,948 B2
(45) Date of Patent: Nov. 23, 2010

(54) PHASE TRANSITION TYPE VALVE AND METHOD OF MANUFACTURING THE SAME

(75) Inventor: Jong-myeon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 11/742,144

(22) Filed: Apr. 30, 2007

(65) Prior Publication Data

US 2007/0264628 A1 Nov. 15, 2007

(30) Foreign Application Priority Data

May 10, 2006 (KR) .................. 10-2006-0041973

(51) Int. Cl.
*B01L 99/00* (2010.01)
(52) U.S. Cl. .............. 422/103; 422/99; 422/100; 422/101; 422/102; 436/180; 137/251.1
(58) Field of Classification Search ......... 422/100–103; 436/180; 137/251.1
See application file for complete search history.

(56) References Cited

U.S. PATENT DOCUMENTS

| 4,949,742 A | 8/1990 | Rando et al. | |
|---|---|---|---|
| 6,302,134 B1 * | 10/2001 | Kellogg et al. | ............... 137/74 |
| 2004/0089616 A1 | 5/2004 | Kellogg et al. | |
| 2006/0093526 A1 | 5/2006 | Faulstich et al. | |

FOREIGN PATENT DOCUMENTS

WO 0102737 A1 1/2001

* cited by examiner

*Primary Examiner*—Jyoti Nagpaul
(74) *Attorney, Agent, or Firm*—Sughrue Mion, PLLC

(57) ABSTRACT

A phase transition type valve is provided. The valve includes a phase transition material filled and hardened in a section of a channel and a tube expanding region which has a larger cross-sectional area than the channel formed at both ends of the section in which the phase transition material is hardened.

6 Claims, 8 Drawing Sheets

PHASE TRANSITION TYPE VALVE AND METHOD OF MANUFACTURING THE SAME

CROSS-REFERENCE TO RELATED PATENT APPLICATIONS

This application claims priority from Korean Patent Applications No. 10-2006-0041973, filed on May 10, 2006, in the Korean Intellectual Property Office, the disclosures of which are incorporated herein in their entirety by reference.

BACKGROUND OF THE INVENTION

1. Field of the Invention

Apparatuses and methods consistent with the present invention relate to a phase transition type valve that is melted by a heat source to open a blocked channel so that a fluid can flow through the channel, and a method of manufacturing the valve.

2. Description of the Related Art

In biochemical experiments such as blood tests, many processes are performed to obtain desired resultants, for example, components of blood having different specific gravities are phase-separated and properties and shape of the desired component are changed by injecting a reagent. If a series of processes are performed manually one by one, it takes a long time, and error generating components are likely to be introduced into the test blood whenever the blood is moved for performing another process. Therefore, a biochemical reaction chip 10 shown in FIG. 1 is generally used so that the series of processes can be performed at one place automatically and rapidly.

In the chip 10, a channel 13, through which a test liquid 1 and a reagent 2 can flow, is formed so that the test liquid 1 and the reagent 2 flow through the channel 13 at a desired time point to perform the processes. For example, a simple sequence in which the reagent is mixed with an upper layer of the test liquid 1 that is phase separated resulting in a resultant coming out through an outlet 12, can be performed as follows. That is, the test liquid 1 is injected through an inlet 11, and a motor 14 is driven to rotate the chip 10. Then, the test liquid 1 is phase-separated due to the centrifugal force. Since the test liquid 1 should not flow through the channel 13 before the phase-separation is finished, a phase transition type valve 15a blocks the channel 13, and then, the valve 15a is opened when the phase-separation is finished. The phase transition type valve 15a is obtained by hardening a hydrophobic material such as wax in a predetermined section of the channel 13, and thus, the wax is melted by the heat energy and the channel 13 is opened. Therefore, when the phase separation is finished and the desired component is collected in the upper layer, a laser is irradiated onto the corresponding valve 15a using a laser diode 16 to melt the valve 15a. Then, the channel 13 is opened, and the upper liquid in the test liquid 1 flows along the channel 13. In addition, the valve 15b blocking the reagent 2 is melted by the laser, and then, the test liquid 1 and the reagent 2 are mixed with each other to make the resultant which is discharged through the outlet 12. The above series of processes are automatically controlled by a controller (not shown), and thus, all the user has to do is just input the test liquid 1 into the inlet 11, and then, start operation of the apparatus to obtain the resultant through the automatic processes.

In order to perform the automatic processes sufficiently, the valves 15a and 15b should be opened precisely at the desired point in time, and thus, the valves 15a and 15b should be hardened exactly at the set positions where the valves 15a and 15b are fabricated. That is, the opening of the valves 15a and 15b is performed by melting the valves 15a and 15b using the laser beam emitted from the laser diode 16, and thus, a focusing region of the laser beam emitted from the laser diode 16 is set to be slightly larger than the sizes of the valves 15a and 15b, and the laser is automatically controlled to be irradiated precisely at predetermined regions. Therefore, if the valves 15a and 15b are hardened out of the predetermined regions, or are hardened larger than a predetermined size of the valves 15a and 15b, the channel 13 is not completely opened even when the laser is irradiated.

The above problem occurs frequently when the valves 15a and 15b are fabricated by injecting the wax onto the corresponding portion of the channel 13. For example, as shown in FIG. 2A, even if the wax 15 is injected through an injection hole 10a with the intention of forming the valve at a section L, the wax 15 may be inclined to one side as shown in FIG. 2B (FIG. 2C is a photograph showing the situation of FIG. 2B), or may be spread wider than is expected as shown in FIG. 2D. In order to solve the above problem, a process for adjusting the hardened location of the wax 15 after injecting the wax 15 should be performed, and the processes of fabricating the valve becomes complex.

SUMMARY OF THE INVENTION

The present invention provides a phase transition type valve that can be formed precisely at a desired location without performing additional processes, and a method of fabricating the same.

According to an aspect of the present invention, there is provided a phase transition type valve including: a phase transition material filled and hardened in a section of a channel; and a tube expanding region which has larger cross-sectional area than that of the channel formed at both ends of the section in which the phase transition material is hardened.

According to another aspect of the present invention, there is provided a method of fabricating a phase transition type valve, the method including: forming a tube expanding region, which has a larger cross-sectional area than a channel, at both ends of a section, in which a phase transition material is to be hardened, in the channel; and injecting the phase transition material in the channel between the tube expanding regions and hardening the phase transition material.

The tube expanding region may be formed having at least one of a square end, a V-shaped end, a U-shaped end, or a dovetail end.

The phase transition material may be one selected from the group consisting of a wax, a gel, and a thermoplastic material.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

Figure 1:
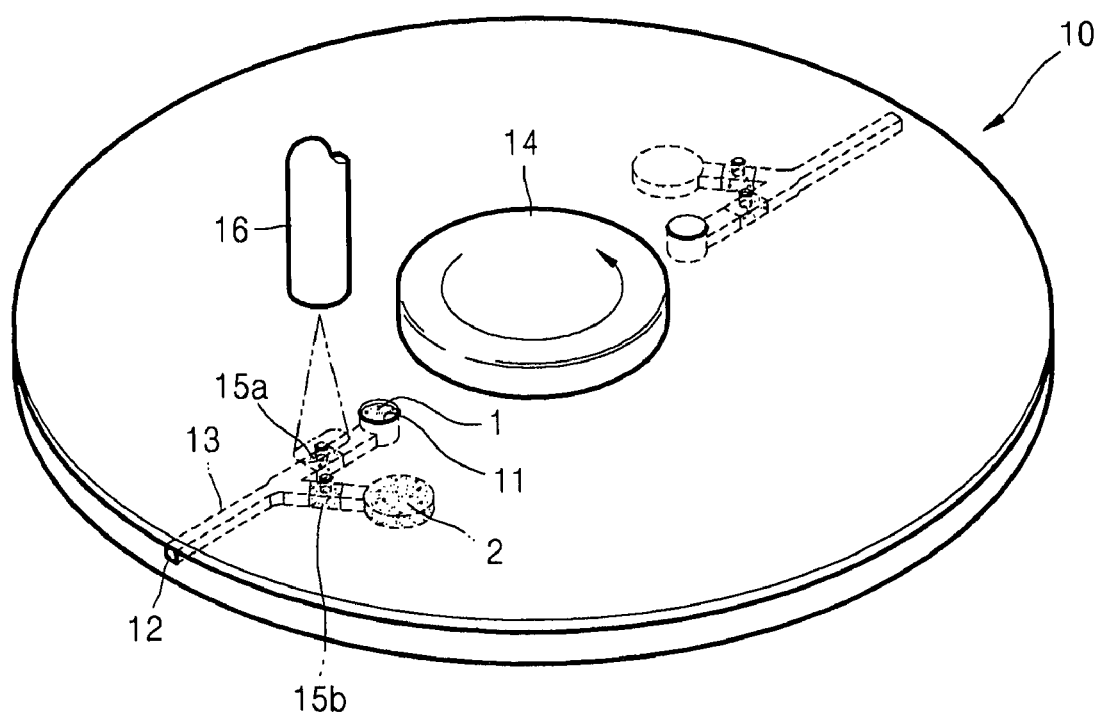
FIG. 1 is a perspective view of a biochemical reaction chip including conventional phase transition type valves.
Figure 2A:
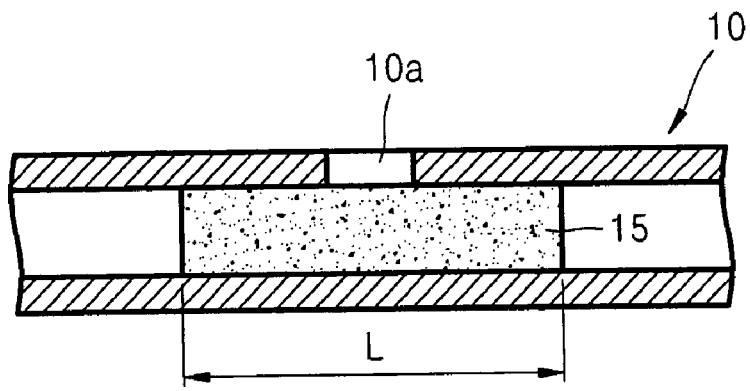
FIG. 2A through 2D are cross sectional diagrams illustrating common problems found when using the phase transition type valves of FIG. 1.
Figure 2B:
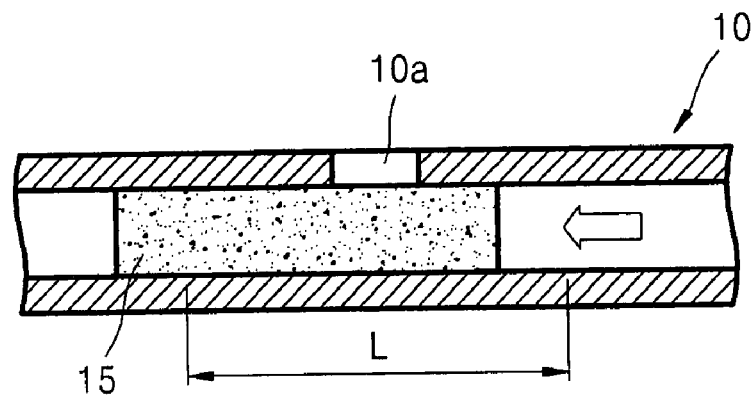
Figure 2C:
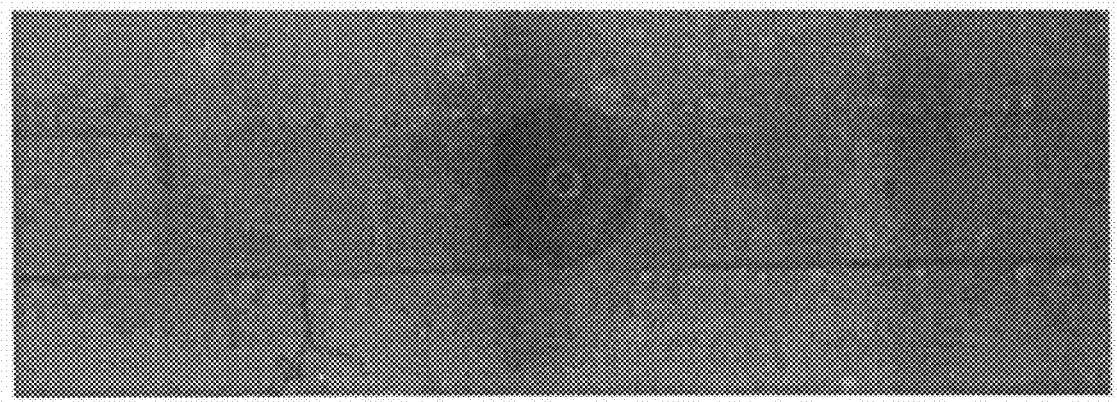
Figure 2D:
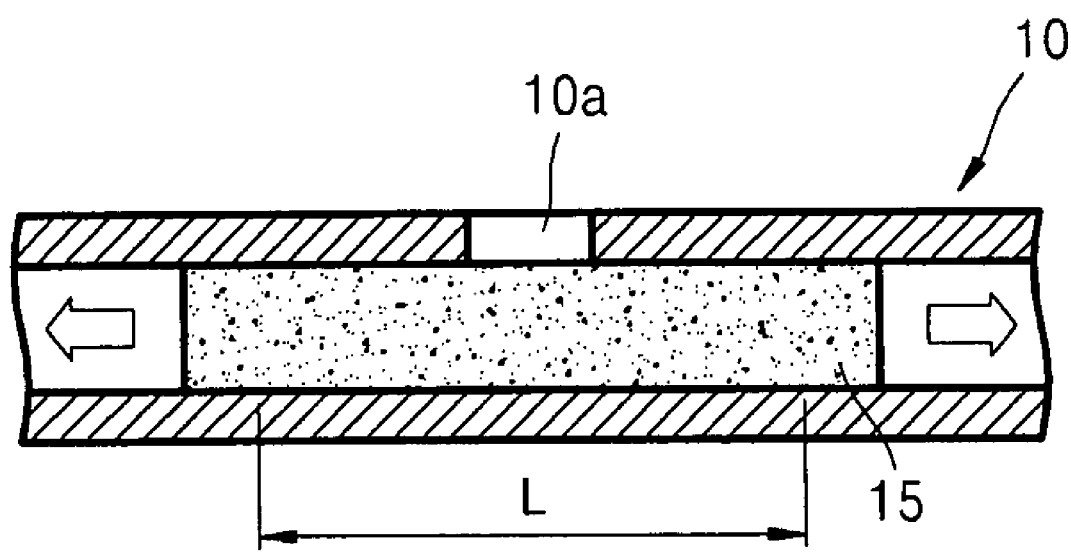
Figure 3:
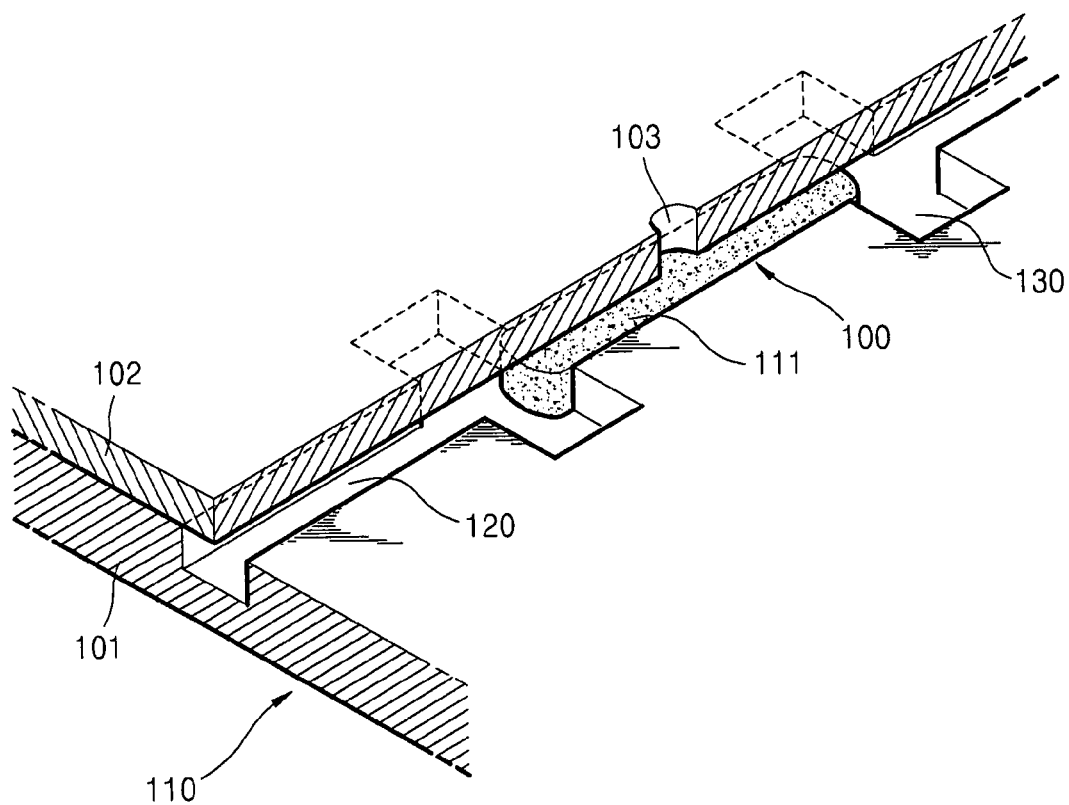
FIG. 3 is a cut-away perspective view of a biochemical reaction chip including a phase transition type valve according to an exemplary embodiment of the present invention.
Figure 4A:
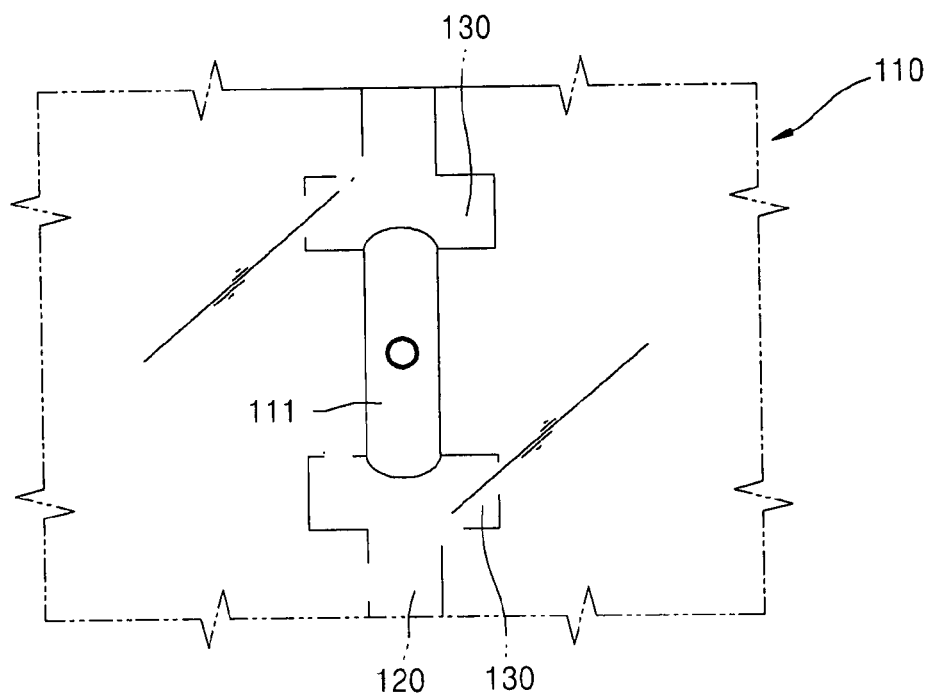
FIG. 4A is a plan view of the phase transition type valve of FIG. 3.
Figure 4B:
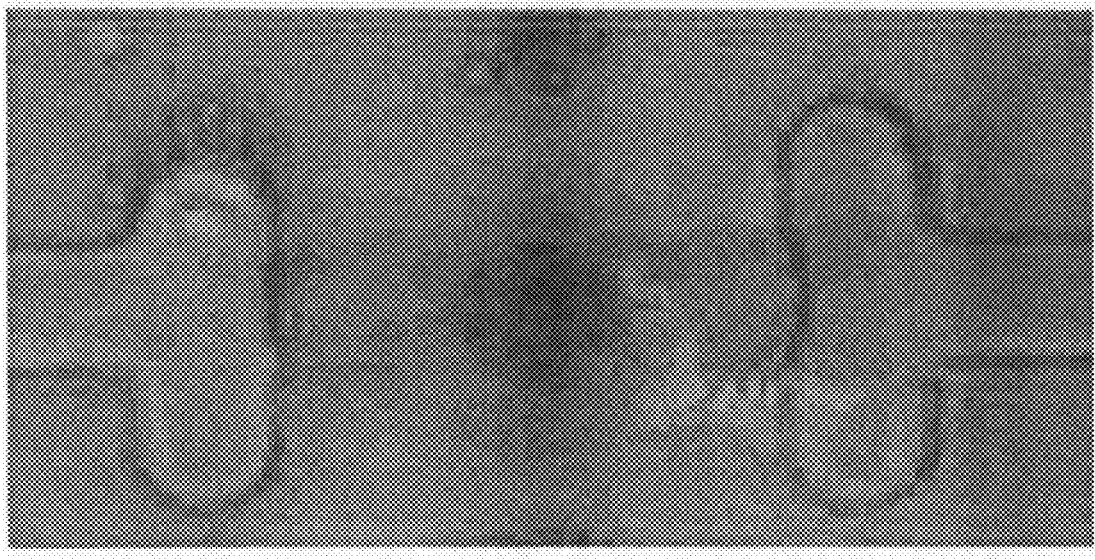
FIG. 4B is an image of the phase transition type valve of FIG. 4A.

FIG. 3 is a cut-away perspective view of a biochemical reaction chip 100 including a phase transition type valve 110 according to an exemplary embodiment of the present invention, FIG. 4A is a plan view of the phase transition type valve 110, and FIG. 4B is an image of the phase transition type valve 110.

The phase transition type valve 110 according to the current exemplary embodiment is formed by hardening a wax 111 that is a phase transition material into a desired section of a channel 120, and then, the wax 111 can be melted by heat source such as a laser to open the channel 120 if necessary. However, the phase transition type valve 110 of the present exemplary embodiment includes a tube expanding region 130 having a larger cross-sectional area than that of the channel 120 formed at both ends of a space in which the wax 111 is to be filled. The tube expanding region 130 is formed at the ends of the space in order to induce the wax 111 that forms the phase transition type valve 110 not to escape a set location and to be formed to have an exact length. That is, when the tube expanding region 130 is formed at the ends of the space, in which the wax 111 will be filled, when the wax 111 is in a melted state, flow of the wax 111 in the channel is impeded by the tube expanding region 130. This is because when the wax 111 reaches the tube expanding region 130, the cross-sectional area of the channel is suddenly increased and empty space appears around the wax 111 which had previously been flowing along wall surfaces of the channel 120. Thus, in this status, an end portion of the melted wax 111 is cohered due to a surface tension as shown in FIGS. 4A and 4B, and then, flow of the wax 111 stops. Therefore, the wax 111 cannot escape both ends of the space defined by the tube expanding region 130, and is filled in the space between the boundaries and hardened over a period of time. Then, the wax 111 is hardened precisely on the desired portion and forms the phase transition type valve 110, and thus, the phase transition type valve 110 can be melted precisely using the laser.

When the phase transition type valve 110 of the present exemplary embodiment is fabricated, the channel 120 having the tube expanding region 130 is formed on a substrate 101 as shown in FIG. 3 using a pressing process, a cover 102 is formed on the channel 120, and then, the melted wax 111 is injected through an injection hole 103. Then, the melted wax 111 flows in the channel 120, and stops at the tube expanding regions 130. In addition, the wax 111 is hardened in the above status to form the phase transition type valve 110.

Therefore, if the biochemical reaction chip 100 having the phase transition type valve 110 formed at the exact location is used in an experiment, the phase transition type valve 110 can be melted precisely at the desired point in time using the laser to open the channel 120. Thus, the experiment can be performed precisely.

Figure 5A:
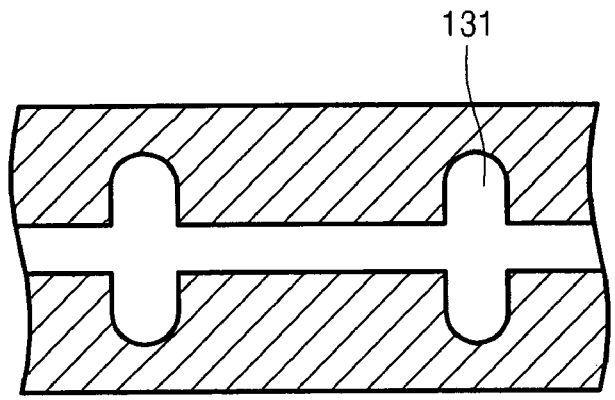
FIGS. 5A through 5F are views of modified examples of the phase transition type valve of FIG. 3.
Figure 5B:
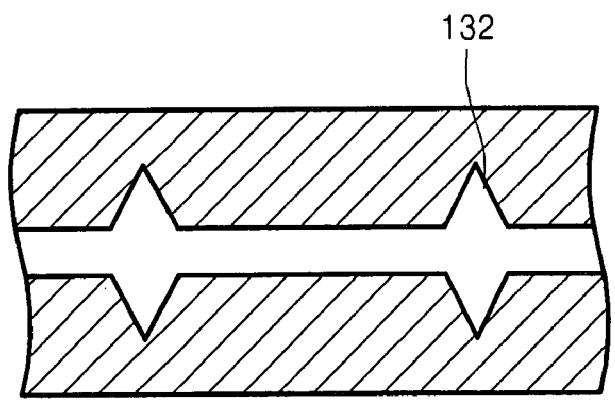
Figure 5C:
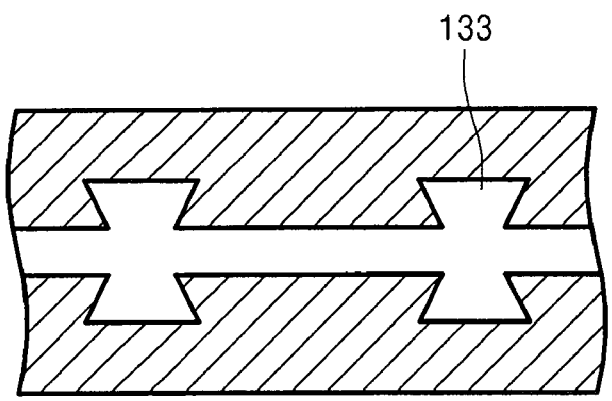
Figure 5D:
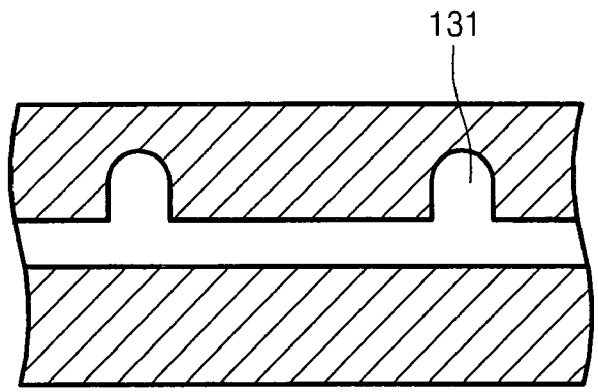
Figure 5E:
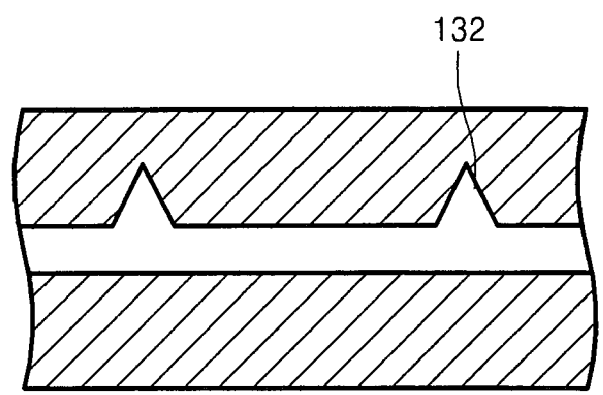
Figure 5F:
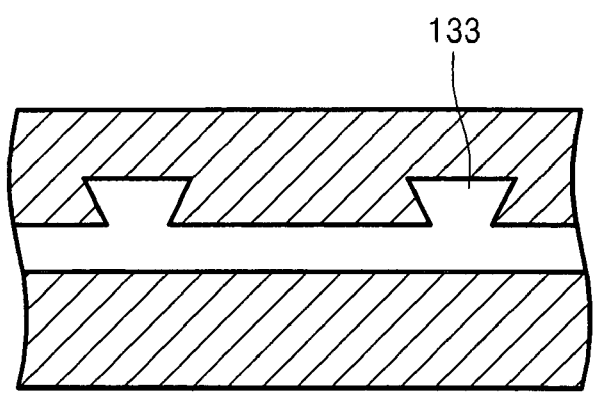

In the present exemplary embodiment, the tube expanding region 130 is formed having square ends, however, the tube expanding region can be formed having U-shaped ends 131 as shown in FIGS. 5A and 5D, V-shaped ends 132 as shown in FIGS. 5B and 5E, or formed having dovetail ends 133 as shown in FIGS. 5C and 5F. As shown in the drawings, the tube expanding region can be symmetrically formed on both sides of the channel, or can be asymmetrically formed on one side of the channel.

In addition, the phase transition material may be at least one of the wax, a gel, and a thermoplastic resin.

The phase transition type valve according to the present invention is fabricated while the phase transition material is hardened at a precise position, and thus, the valve can be opened at the desired point in time.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A phase transition type valve comprising:
   a channel including at least first and second sections;
   a phase transition material filled and hardened in only the first section of the channel;
   first and second tube expanding regions which are respectively formed at both ends of the first section of the channel and have a larger cross-sectional area than that of the first and second sections of the channel; and
   an injection hole for injecting the phase transition material in the channel, the injection hole being positioned between both ends of the first section and in a cover covering the channel,
   wherein the first tube expanding region is formed between the first section of the channel and the second section of the channel.

2. The phase transition type valve of claim 1, wherein the each of the first and second tube expanding regions is formed having at least one of a square end, a V-shaped end, a U-shaped end, or a dovetail end.

3. The phase transition type valve of claim 1, wherein the phase transition material is one selected from the group consisting of a wax, a gel, and a thermoplastic material.

4. A method of fabricating a phase transition type valve, the method comprising:
   forming first and second tube expanding regions at both ends of a first section of a channel, wherein the first tube expanding region is formed between the first section of the channel and a second section of the channel, and the first and second tube expanding regions have a larger cross-sectional area than that of the first and second regions of the channel; and
   injecting a phase transition material in only the first section of the channel between the tube expanding regions and hardening the phase transition material,
   wherein the injecting of the phase transition material in the channel is performed through an injection hole positioned between both ends of the first section and in a cover covering the channel.

5. The method of claim 4, wherein the each of tube expanding regions is formed to have at least one of a square end, a V-shaped end, a U-shaped end, or a dovetail end.

6. The method of claim 4, wherein the phase transition material is one selected from the group consisting of a wax, a gel, and a thermoplastic material.

* * * * *